US011004047B2

(12) United States Patent
Guyot (10) Patent No.: US 11,004,047 B2
(45) Date of Patent: May 11, 2021

(54) TAILORED DISPLAY OF PAYMENT OPTIONS

(71) Applicant: EBAY INC., San Jose, CA (US)

(72) Inventor: Remi Guyot, Paris (FR)

(73) Assignee: eBay Inc., San Jose, CA (US)

( * ) Notice: Subject to any disclaimer, the term of this patent is extended or adjusted under 35 U.S.C. 154(b) by 152 days.

(21) Appl. No.: 15/920,280

(22) Filed: Mar. 13, 2018

(65) Prior Publication Data

US 2018/0204197 A1 Jul. 19, 2018

Related U.S. Application Data

(63) Continuation of application No. 13/657,618, filed on Oct. 22, 2012, now Pat. No. 9,934,500.

(51) Int. Cl.
*G06Q 20/20* (2012.01)
*G06Q 30/06* (2012.01)

(52) U.S. Cl.
CPC ......... *G06Q 20/20* (2013.01); *G06Q 30/0613* (2013.01); *G06Q 30/0641* (2013.01)

(58) Field of Classification Search
CPC .. G06Q 30/0255; G06Q 20/145; G06Q 20/22; G06Q 30/0641
See application file for complete search history.

(56) References Cited

U.S. PATENT DOCUMENTS

| | | | |
|---|---|---|---|
| 6,415,261 B1 | 7/2002 | Cybul et al. | |
| 7,213,742 B1 | 5/2007 | Birch et al. | |
| 9,934,500 B2 | 4/2018 | Guyot | |
| 2005/0228750 A1* | 10/2005 | Olliphant | G06Q 20/02 705/40 |
| 2005/0267787 A1 | 12/2005 | Rose et al. | |
| 2006/0178986 A1 | 8/2006 | Giordano et al. | |
| 2009/0299878 A1 | 12/2009 | Keresman et al. | |
| 2010/0082445 A1 | 4/2010 | Hodge et al. | |
| 2011/0251892 A1 | 10/2011 | Laracey | |
| 2012/0030583 A1 | 2/2012 | Dipietro | |
| 2012/0123841 A1 | 5/2012 | Taveau et al. | |
| 2012/0197691 A1 | 8/2012 | Grigg et al. | |
| 2013/0282443 A1 | 10/2013 | Bal et al. | |
| 2014/0012704 A1 | 1/2014 | Mizhen et al. | |

(Continued)

OTHER PUBLICATIONS

"PayPal Access API", Retrieved from the Internet URL: <https://www.x.com/developers/paypal/products/paypal-access>, Accessed on Oct. 19, 2012, 3 pages.

(Continued)

*Primary Examiner* — A. Hunter Wilder
(74) *Attorney, Agent, or Firm* — Faegre Drinker (57) ABSTRACT

A system according to an embodiment comprises one or more processors; and one or more memories in communication with the one or more processors and adapted to store a plurality of machine-readable instructions which when executed by the one or more processors are adapted to cause the system to: offer, by a merchant at a Point of Sale (POS), at least one payment option in connection with a transaction for at least one item, wherein the payment option(s) is presented in a display tailored to a specific user based on information maintained by the merchant about the specific user; and process the transaction using a payment option selected by the user.

20 Claims, 4 Drawing Sheets

(56) References Cited

U.S. PATENT DOCUMENTS

2014/0114777 A1 4/2014 Guyot
2014/0129357 A1 5/2014 Goodwin

OTHER PUBLICATIONS

"X.commerce Segmentation Service API", https://www.x.com/developers/paypal/documentation-tools/api/segmentation-service-api-reference, Accessed on Oct. 19, 2012, 3 pages.
Advisory Action received for U.S. Appl. No. 13/657,618, dated Feb. 1, 2017, 5 pages.
Advisory Action received for U.S. Appl. No. 13/657,618, dated Feb. 4, 2016, 5 pages.
Final Office Action received for U.S. Appl. No. 13/657,618, dated Jan. 21, 2015, 14 pages.
Final Office Action received for U.S. Appl. No. 13/657,618, dated Nov. 23, 2016, 22 pages.
Final Office Action received for U.S. Appl. No. 13/657,618, dated Oct. 28, 2015, 23 pages.
Non-Final Office Action received for U.S. Appl. No. 13/657,618, dated Jun. 19, 2017, 20 pages.
Non-Final Office Action received for U.S. Appl. No. 13/657,618, dated Jun. 27, 2016, 22 pages.
Non-Final Office Action received for U.S. Appl. No. 13/657,618, dated May 8, 2015, 18 pages.
Non-Final Office Action received for U.S. Appl. No. 13/657,618, dated Sep. 18, 2014, 13 pages.
Notice of Allowance received for U.S. Appl. No. 13/657,618, dated Nov. 22, 2017, 21 pages.
Response to Advisory Action and Final Office Action filed on Mar. 25, 2016, for U.S. Appl. No. 13/657,618, dated Feb. 4, 2016 and Oct. 28, 2015, 15 pages.
Response to Final Office Action filed on Apr. 7, 2015, for U.S. Appl. No. 13/657,618, dated Jan. 21,2015, 12 pages.
Response to Final Office Action filed on Jan. 20, 2017, for U.S. Appl. No. 13/657,618, dated Nov. 23, 2016, 15 pages.
Response to Final Office Action filed on Jan. 22, 2016, for U.S. Appl. No. 13/657,618, dated Oct. 28, 2015, 13 pages.
Response to Final Office Action filed on Mar. 23, 2017, for U.S. Appl. No. 13/657,618, dated Nov. 23, 2016, 14 pages.
Response to Non-Final Office Action filed on Aug. 7, 2015, for U.S. Appl. No. 13/657,618, dated Sep. 18, 2014, 18 pages.
Response to Non-Final Office Action filed on Dec. 12, 2014, for U.S. Appl. No. 13/657,618, dated Sep. 18, 2014, 12 pages.
Response to Non-Final Office Action filed on Oct. 19, 2017, for U.S. Appl. No. 13/657,618, dated Jun. 19, 2017, 11 pages.
Response to Non-Final Office Action filed on Sep. 27, 2016, for U.S. Appl. No. 13/657,618, dated Jun. 27, 2016, 15 pages.

* cited by examiner

TAILORED DISPLAY OF PAYMENT OPTIONS

CROSS-REFERENCE

This application is a continuation of U.S. patent application Ser. No. 13/657,618 filed Oct. 22, 2012, now issued U.S. Patent No. 9,934,500, the complete disclosure of which is herein incorporated by reference, in its entirety.

BACKGROUND

Technical Field

Embodiments of the present disclosure generally relate to transactions, and more particularly, to methods and systems for tailored display of payment options.

Related Art

Customers routinely search for, purchase and pay for products and/or services at business locations or over communication networks, such as the Internet. Individual customers may frequently engage in transactions with a variety of merchants at a merchant's Point of Sale (POS), for example, in-store or through various merchant websites. There are many forms of payment that customers may select to engage in transactions. Common ways of making payments at a merchant's location or over the Internet include using a credit card, a debit card, cash, or the like. Routinely, customers may also engage in such transactions by using their mobile devices to make payments.

BRIEF DESCRIPTION OF THE FIGURES

Like element numbers in different figures represent the same or similar elements.

DETAILED DESCRIPTION

In accordance with various embodiments described herein, methods and systems are provided wherein payment options may be displayed in a tailored, customized, or personalized manner to a specific user so that the user may conduct transactions in connection with applications, products and/or services ("items") using a selected one of the displayed payment options. In various embodiments, for example during an online checkout flow, past payment behavior and/or preferences of a particular user may be used to customize a merchant page that presents or displays tailored, customized or personalized payment options offered to the particular user. A payment application may be loaded on a client device of a user by a payment service provider, a merchant, or another appropriate entity that enables the user to have the payment options displayed on the client device for easily making payments. In one embodiment, the payment application may be provided by a payment service provider such as PayPal®, Inc. and/or eBay®, Inc. of San Jose, Calif. USA.

As such, according to one or more embodiments of the present disclosure, a merchant may offer or suggest one or more particular payment options or funding sources that are relevant for the user. That is, merchants themselves may suggest to customers a "best" mix of funding sources (e.g., transaction cards, gift cards, cash, payment provider services (e.g., PayPal®) and/or special offers or promotions such as coupons, 2 for 1 offers, loyalty points, etc. for the customer to use for a transaction. For example, a merchant may have an upcoming special promotion using coupons, etc. and sees that the customer used to be a good customer but has not purchased much recently. The merchant may provide, as an option, the special promotion to the user even though the official start date for the promotion may be at a later time. The payment options or funding sources offered or suggested by the merchant may be based on information from various sources including publicly available information in addition to information that is known only to the merchant to which other entities (e.g. funding source entities, payment provider services, etc.) may not have access.

A user may simply select a payment option as suggested by the merchant in the tailored display in connection with a transaction, for example, to purchase an item, and quickly pay or exercise various payment options via the client device or in-store at the merchant's POS.

Figure 1:
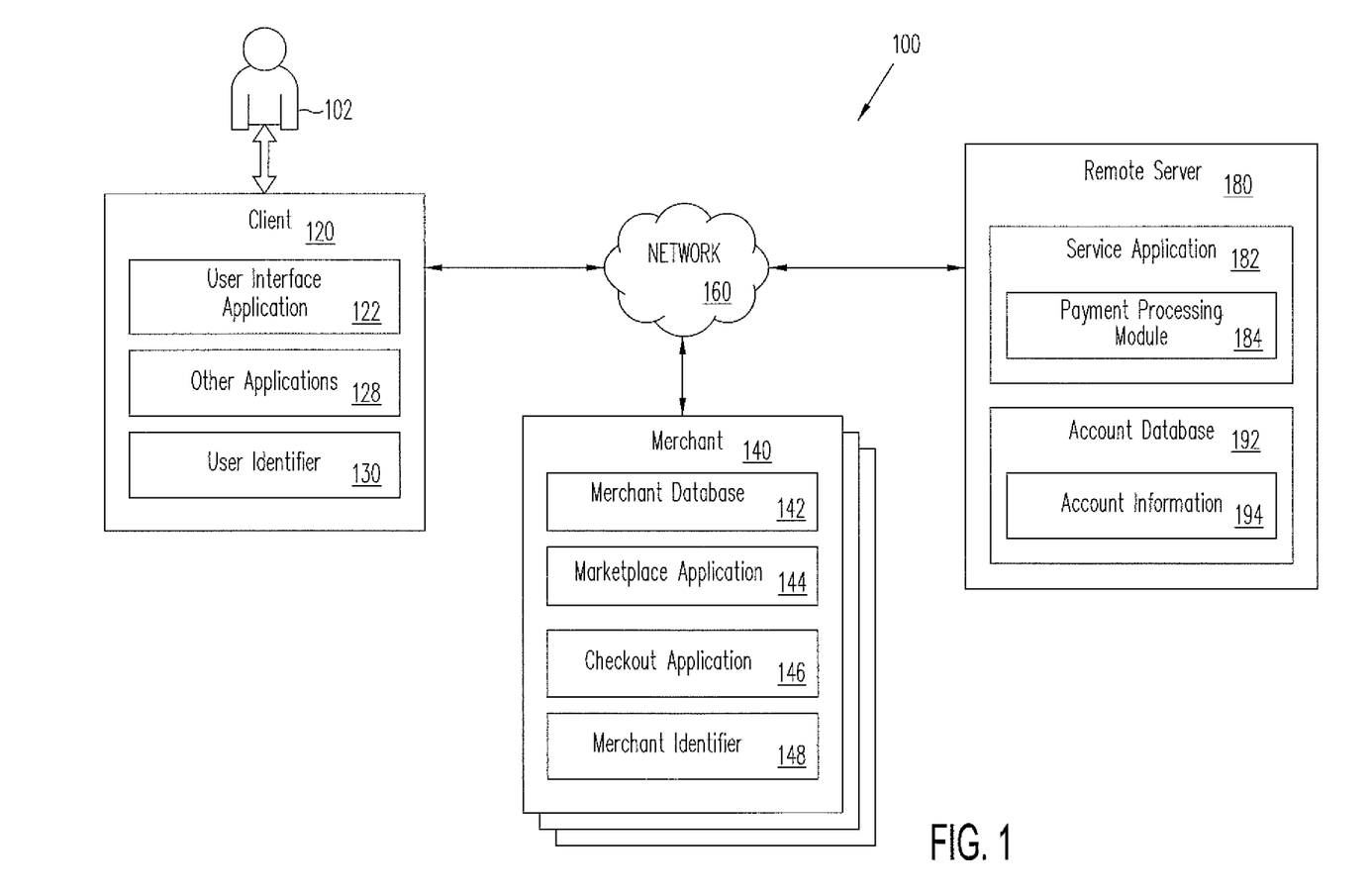
FIG. 1 illustrates a block diagram of a system for a tailored display of payment options according to an embodiment of the present disclosure.

Referring now to the drawings wherein the showings are for purposes of illustrating embodiments of the present disclosure only, and not for purposes of limiting the same, FIG. 1 illustrates a block diagram of a system for a tailored display of payment options according to an embodiment of the present disclosure.

FIG. 1 shows one embodiment of a block diagram of a system 100 adapted to facilitate displaying payment options in connection with transactions via a client device 120 over a network 160. As shown in FIG. 1, the system 100 includes at least one client device 120 (e.g., network computing device), one or more merchant servers or devices 140 (e.g., network server devices), and at least one remote server or device 180 such as a service provider server or device (e.g., network server device) in communication over the network 160.

The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the client device 120, merchant servers or devices 140, and remote server or device 180 may be associated with a particular link (e.g., a link, such as a URL (Uniform Resource Locator) to an IP (Internet Protocol) address).

The client device 120, in various embodiments, may be implemented using any appropriate combination of hardware and/or software configured for wired and/or wireless communication over the network 160. In various examples, the client device 120 may be implemented as a wireless telephone (e.g., cellular or mobile phone), a tablet, a personal digital assistant (PDA), a personal computer, a notebook computer, and/or various other generally known types of wired and/or wireless computing devices. Other examples of client device 120 include a television set, a game console, a Digital Video Recorder (DVR), etc. It should be appreciated that the client device 120 may be referred to as a user device or a customer device without departing from the scope of the present disclosure.

The client device 120, in one embodiment, includes a user interface application 122, which may be utilized by the user 102 to conduct financial transactions (e.g., shopping, purchasing, bidding, etc.) with the remote server 180 (e.g., a payment service provider server) over the network 160. In one embodiment, a payment option using remote server 180 for purchase expenses may be displayed and selected on client device 120, and in this case, the purchase expenses may be directly and/or automatically debited from an account related to the user 102 via the user interface application 122.

In one implementation, the user interface application 122 comprises a software program, such as a graphical user interface (GUI), executable by a processor that is configured to interface and communicate with the remote server 180 via the network 160. In another implementation, the user interface application 122 comprises a browser module that provides a network interface to browse information available over the network 160. For example, the user interface application 122 may be implemented, in part, as a web browser to view information available over the network 160. In another example, the user 102 is able to access merchant websites via the one or more merchant servers 140 to view and select items for purchase, and the user 102 is able to purchase items from the one or more merchant servers 140 via the remote server 180. Accordingly, the user 102 may conduct financial transactions (e.g., purchase and provide payment for items) from the one or more merchant servers 140 via the remote server 180, or via a selected payment option displayed on the device 120 as will be described in more detail below according to one or more embodiments.

The client device 120, in various embodiments, may include other applications 128 as may be desired in one or more embodiments of the present disclosure to provide additional features available to the user 102. In one example, such other applications 128 may include security applications for implementing client-side security features, programmatic client applications for interfacing with appropriate application programming interfaces (APIs) over the network 160, and/or various other types of generally known programs and/or software applications. In still other examples, the other applications 128 may interface with the user interface application 122 for improved efficiency and convenience.

According to one or more embodiments, the user interface application 122 or the other applications 128 include a payment application that may be loaded on client device 120 by remote server 180, by merchant server 140, or by any other appropriate entity. Such payment application enables user 102 to see a tailored display of payment options on client device 120, and easily make payments for items over client device 120 using a selected payment option as will be described in further detail herein.

The client device 120, in one embodiment, may include at least one user identifier 130, which may be implemented, for example, as operating system registry entries, cookies associated with the user interface application 122, identifiers associated with hardware of the client device 120, or various other appropriate identifiers. In various embodiments, user 120 may simply be identified, for example by a merchant, when the user logs into an account created, for example, on a merchant's website. The user identifier 130 may include one or more attributes related to the user 102, such as personal information related to the user 102 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, the user identifier 130 may be passed with a user login request to a merchant server 140 or to the remote server 180 via the network 160, and the user identifier 130 may be used by a merchant server 140 or by remote server 180 to associate the user 102 with a particular user account maintained by the merchant server 130 or by the remote server 180.

The one or more merchant servers 140, in various embodiments, may be maintained by one or more merchants or entities, profit or non-profit (or in some cases, by a partner of an entity that processes transactions on behalf of business entities). Examples of merchants or entities include business sites or locations, resource information sites or locations, utility sites or locations, real estate management sites or locations, social networking sites, etc., which may offer various items for purchase and payment. In some embodiments, entities may need registration of the user identity information as part of offering the items to the user 102 over the network 160. As such, each of the one or more merchant servers 140 may include a merchant database 142 for identifying available items, which may be made available to the client device 120 for viewing and purchase by the user 102. In various embodiments, the merchant database 142 may include information specific to the client such as behavior and preferences (e.g., payment preferences) of particular users such as user 102. It should be appreciated that although a user-merchant transaction is illustrated in this embodiment, the system may also be applicable to user-user, merchant-merchant and/or merchant-user transactions. Also, it should be appreciated that although transactions with a client device over a network are illustrated in this embodiment, the system may also be applicable for presenting or displaying tailored payments during in-store transactions.

Each of the merchant servers 140, in one embodiment, may include a marketplace application 144, which may be configured to provide information over the network 160 to the user interface application 122 of the client device 120. For example, the user 102 may interact with the marketplace application 144 through the user interface application 122 over the network 160 to search and view various items available for purchase in the merchant database 142.

Each of the merchant servers 140, in one embodiment, may include a checkout application 146, which may be configured to facilitate online financial transactions (e.g., purchase transactions) by the user 102 of items identified by the marketplace application 144. As such, in one aspect, the checkout application 146 may be configured for presenting a tailored display of payment options to client device 120 as well as accepting payment information from the user 102 over the network 160.

Each of the merchant servers 140, in one embodiment, may include at least one merchant identifier 148, which may be included as part of the one or more items made available for purchase so that, e.g., particular items are associated with particular merchants. In one implementation, the merchant identifier 148 may include one or more attributes and/or parameters related to the merchant, such as business and banking information. In an embodiment, the user 102 may conduct financial transactions (e.g., selection, monitoring, purchasing, and/or providing payment for items) with each merchant server 140 via the remote server 180 over the network 160.

In various embodiments, merchant server 140 may be configured to maintain one or more user accounts in an account database such as merchant database 142, each of which may include account information associated with one or more individual users (e.g., user 102). For example, account information maintained in merchant database 142 may include specific user information based on user past behaviors and/or preferences gathered from information obtained from the various financial transactions conducted between specific users and merchant server 140 such as type of payment options used and how often they are used by the particular user. In one or more embodiments, account information based on past transaction behavior and preferences may also include specific user information gathered from information obtained from various transactions that happened between the user and other merchants. For example, past transaction behavior and preferences of each user 102 may include information known only to the merchant associated with a merchant server 140 about specific payment options most and/or least preferred by the specific user, frequency of shopping by the specific user at the merchant's POS, and/or specific user shopping habits. For instance, a particular user may usually prefer to use a certain credit card to pay for particular items. In other instances, a particular user may always conduct transactions using a payment service provider. Also, one or more account numbers, passwords, credit card information, banking information, or other types of financial information, may be maintained in merchant database 142 for each user.

In various embodiments, past transaction behavior and preferences of each user 102 may also include publicly-shared information, for example, information about transactions between the user and other merchants, information from an online passport used for shopping that captures the user's preferences and shares them with any merchants the user visits, etc.

In one implementation, each merchant server 140 may have user 102 identity attributes stored, and the user 102 may have credentials to authenticate or verify identity with the merchant server 140. User attributes may include personal information, banking information and/or funding sources. Also, user attributes may include plain payment preferences such as "I always want to pay with a credit card." In various aspects, the user attributes may be passed to the merchant server 140 as part of a login, selection, purchase, and/or payment request, and the user attributes may be utilized by the merchant server 140 to associate the user 102 with one or more particular user accounts maintained by the merchant server 140. In various embodiments, the user may identify him or herself before arriving on a payment webpage in connection with a transaction, thus facilitating the presentation of a tailored display of payment options to the particular user.

The remote server 180, in one embodiment, may be maintained by a transaction processing entity, which may provide processing for financial transactions and/or information transactions between the user 102 and one or more of the merchant servers 140. As such, the remote server 180 includes a service application 182, which may be adapted to interact with each client device 120 and/or each merchant server 140 over the network 160 to facilitate the selection, purchase, and/or payment of items by the user 102 from one or more of the merchant servers 140. In one example, the remote server 180 may be provided by PayPal®, Inc. and/or eBay® of San Jose, Calif., USA.

The service application 182, in one embodiment, utilizes a payment processing module 184 to process purchases and/or payments for financial transactions between the user 102 and each of the merchant servers 140. In one implementation, the payment processing module 184 assists with resolving financial transactions through validation, delivery, and settlement. As such, the service application 182 in conjunction with the payment processing module 184 settles indebtedness between the user 102 and each of the merchants 140, wherein accounts may be directly and/or automatically debited and/or credited of monetary funds in a manner as accepted by the banking industry.

The remote server 180, in one embodiment, may be configured to maintain one or more user accounts and merchant accounts in an account database 192, each of which may include account information 194 associated with one or more individual users (e.g., user 102) and merchants (e.g., one or more merchants associated with merchant servers 140). For example, account information 194 may include private financial information of each user 102 and each merchant associated with the one or more merchant servers 140, such as one or more account numbers, passwords, credit card information, banking information, or other types of financial information, which may be used to facilitate financial transactions between the user 102 and the one or more merchants associated with the merchant servers 140. In various aspects, the methods and systems described herein may be modified to accommodate users and/or merchants that may or may not be associated with at least one existing user account and/or merchant account, respectively.

In one implementation, the user 102 may have identity attributes stored with the remote server 180, and the user 102 may have credentials to authenticate or verify identity with the remote server 180. User attributes may include personal information, banking information and/or funding sources as previously described. Also, user attributes may include plain payment preferences such as "I always want to pay with a credit card." In various aspects, the user attributes may be passed to the remote server 180 as part of a login, selection, purchase, and/or payment request, and the user attributes may be utilized by the remote server 180 to associate the user 102 with one or more particular user accounts maintained by the remote server 180.

The system described above with respect to the embodiment of FIG. 1 may be used to customize, for example a merchant page, to present tailored payment options offered to a particular user, for example, during an online checkout flow based on user past payment behavior and/or preferences.

Figure 2:
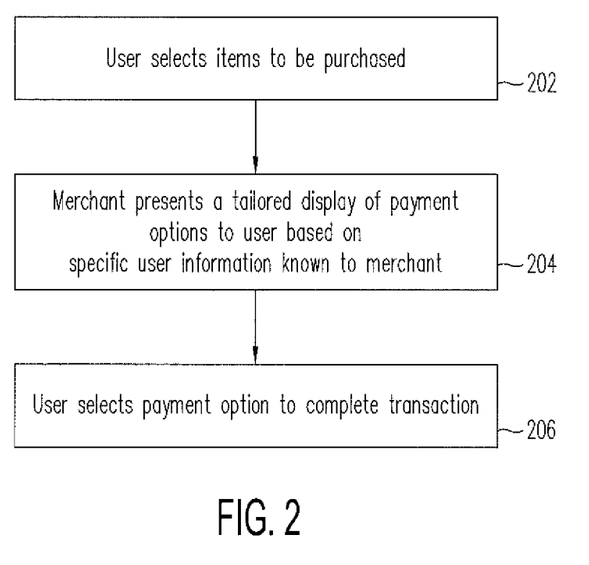
FIG. 2 is a flow diagram of a method for presenting a tailored display of payment options according to an embodiment of the present disclosure.

Referring now to FIG. 2, a flow diagram illustrates a method for presenting a tailored display of payment options according to an embodiment of the present disclosure. According to one or more embodiments, the method illustrated in FIG. 2 may be implemented by the system of FIG. 1.

In block 202, a user may search for and select one or more items offered by a merchant on a merchant's website to be purchased online. In other embodiments, the user may search for and select item(s) offered by a merchant at a physical location such as a store.

In block 204, a merchant presents a tailored display of payment options to the user based on specific user information known to the merchant.

Traditionally, a merchant, e.g., at a Point of Sale (POS) device or terminal, may display as many payment options as possible to a consumer in connection with a transaction (e.g., during checkout). The consumer may then choose a payment option. In one or more embodiments herein, the merchant may display to each consumer one or more payment options that the consumer may be more likely to prefer. In this regard, less payment options may be displayed, rather than displaying as many payment options as possible as is done traditionally, thus facilitating the consumer's decision for choosing a preferred or favorite payment option while also increasing the conversion rate of a checkout flow. In general, decisions may be easier to make when there are less payment options (provided the options left are the right ones). Examples of payment options may include transaction cards (e.g., credit cards, debit cards, store cards, or the like), cash, payment provider services (e.g., PayPal®), gift cards, special promotions or offers (e.g., coupons, 2 for 1 offers, loyalty points, etc.) and/or any other appropriate funding sources.

It should be understood that POS devices or terminals may include a website, a physical location terminal or device, etc. As such, payment options may be presented by merchants online as well as at a physical POS location. For example, during check out at a store, the merchant may display different payment options to the user in various ways such as physical listings, displayed at a terminal, etc.

In various embodiments, using applicable technologies including platforms and services, when customers identify themselves to check out at a merchant's POS, the merchant may know preferences of the customers with respect to one or more particular payment options, for example, the merchant may know that a particular customer pays mostly with PayPal®. In an embodiment, the merchant may decide to display the customer's favorite payment option (e.g., PayPal®) at the top, and may even decide to remove other payment options if the particular customer has a most favorite payment option. In various embodiments, a customer that has a favorite (or most preferred) payment option may be one that uses the particular payment option for at least 25 transactions per year. In other embodiments, a customer may explicitly identify his or her favorite form of payment (e.g., "I always pay with credit card X".)

In block 206, the user may select a preferred payment option to complete a transaction associated with one or more items.

Figure 3:
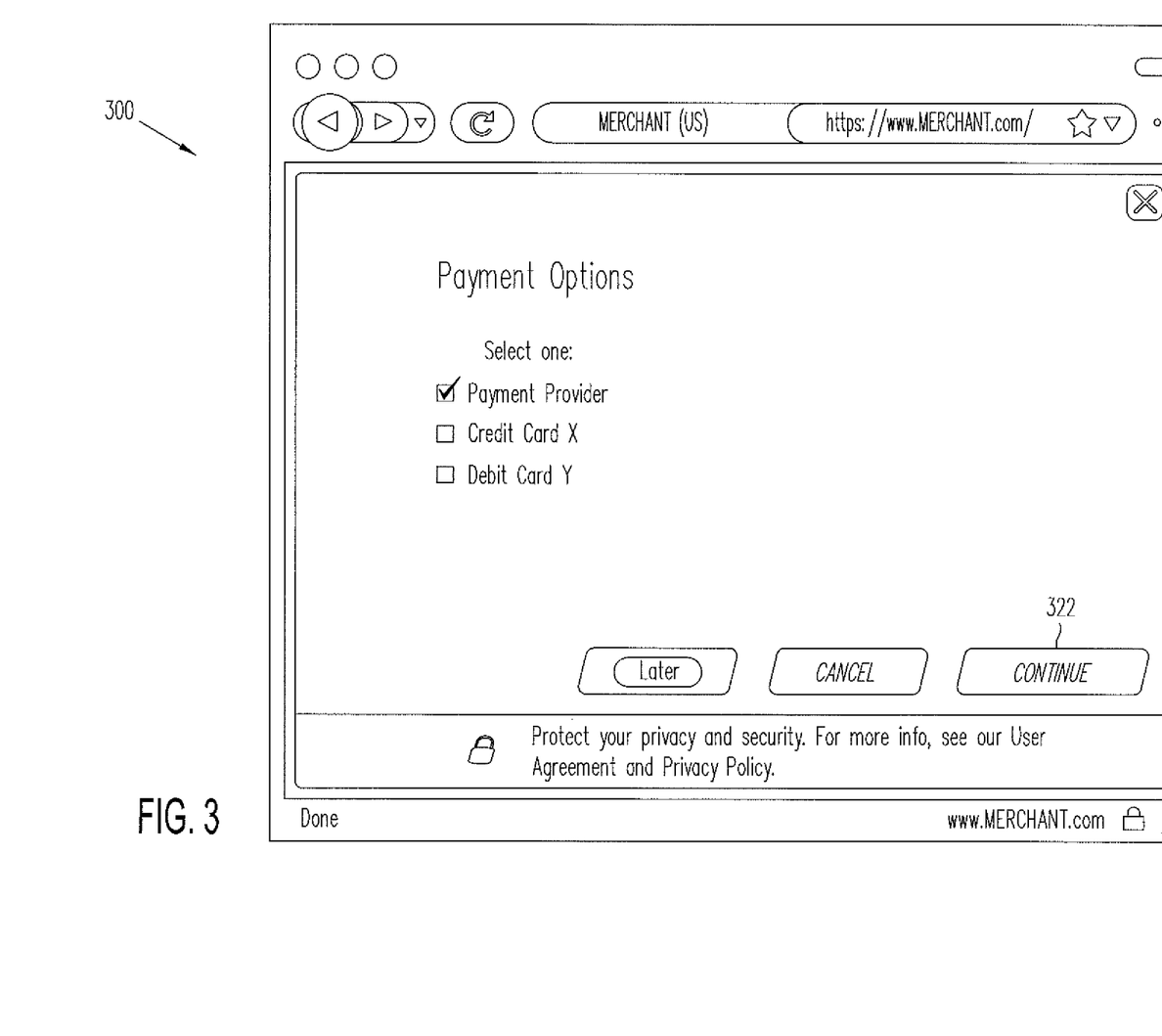
FIG. 3 is a diagram illustrating a tailored display of payment options during a check out flow on a user device according to an embodiment of the present disclosure.

Referring now to FIG. 3, a diagram illustrates a tailored display of payment options during a check out flow on a user device according to an embodiment of the present disclosure.

As described above, according to one or more embodiments, a user of a client device may search and select one or more items offered by a merchant at a merchant's website or at a physical location. In that regard, the user of the client device may add to a cart one or more items available online. Once presented with the cart contents, the user may review the contents of the cart and edit as needed (e.g., add or remove items from the cart) by selecting one or more interfaces labeled "Remove/Edit", or any other appropriate label. For example, the user may decide to not purchase an item, to add another item, to change the size of an item, etc. Once ready for checkout, the user may select an interface labeled "Purchase Now" (or any other appropriate label) to proceed with the transaction in connection with the selected items.

As illustrated in the example of FIG. 3, the merchant may present or offer a tailored display with one or more payment options based on past behavior and/or preferences of the particular user. For example, the merchant may suggest or offer one or more payment options during checkout including, for example, a payment provider (e.g., PayPal®), a transaction card, a special promotion, etc. The merchant may list the user's favorite (or most preferred) payment options in descending order. For example, if the user usually pays using a payment service provider (e.g. more than 25 times a year) rather than other forms of payment, then the payment service provider may be listed at the top of the list of payment options suggested by the merchant. If the user sometimes uses a credit card (e.g., 10 times a year), but not as often as the payment service provider, then the particular credit card may be listed second from the top. If the user rarely uses a debit card (e.g., 5 times a year) or less often than the particular credit card and the payment service provider, then the debit card may be listed third from the top, and so on. In other embodiments, if the user almost always (if not always) uses a particular form of payment, for example, if the user always pays via a payment service provider or has explicitly stated so, then the merchant may only list the payment service provider as a payment option. In other embodiments, the user's favorite (or most preferred) payment option may be highlighted or be more prominently displayed, for example, with an increased visual appeal, than those payment options that are used less often by the user. Still in other embodiments, payment options that are less preferred by the user may be hidden behind a link. It should be understood that the payment options may be presented in various formats as may be appropriate, for example, in descending order of preference as described in the above example, in ascending order of preference, from the most preferred payment option listed on the left to the least preferred payment option listed on the right or vice versa, or in a flash or pop ups, etc.

In this example of FIG. 3, upon the user having selected certain items and having decided to proceed with the transaction, the merchant may offer the user payment options such that the payment option that is more likely to be preferred by the user is listed at the top, followed by payment options that the user may not be as likely to prefer. Here, a payment provider is listed at the top, followed by a particular credit card X, followed by a particular debit card Y.

In various embodiments, the merchant has specific information for determining user behavior or preferences including, for example, that the user usually pays with a payment service provider and less often with a credit card. In other instances, the user may explicitly indicate that he or she always uses a particular form of payment, for example, a particular credit card. Also, in various embodiments, the merchant may present special offers tailored to the particular user, for example, a coupon or loyalty points to further encourage the customer to enhance his or her purchase by potentially buying a similar product or a larger quantity of items.

Once the user chooses a particular payment option, for example, a payment provider as indicated in the example of FIG. 3, the user may select an interface 322 labeled "Continue" (or any other appropriate label) to proceed with the transaction.

The checkout flow is completed upon the user choosing a payment option to conclude the transaction. In this example, the user chose to use Payment Provider to process complete the transaction. It should be noted that the user may log in to his or her account with the payment provider to process or complete the transaction.

Figure 4:
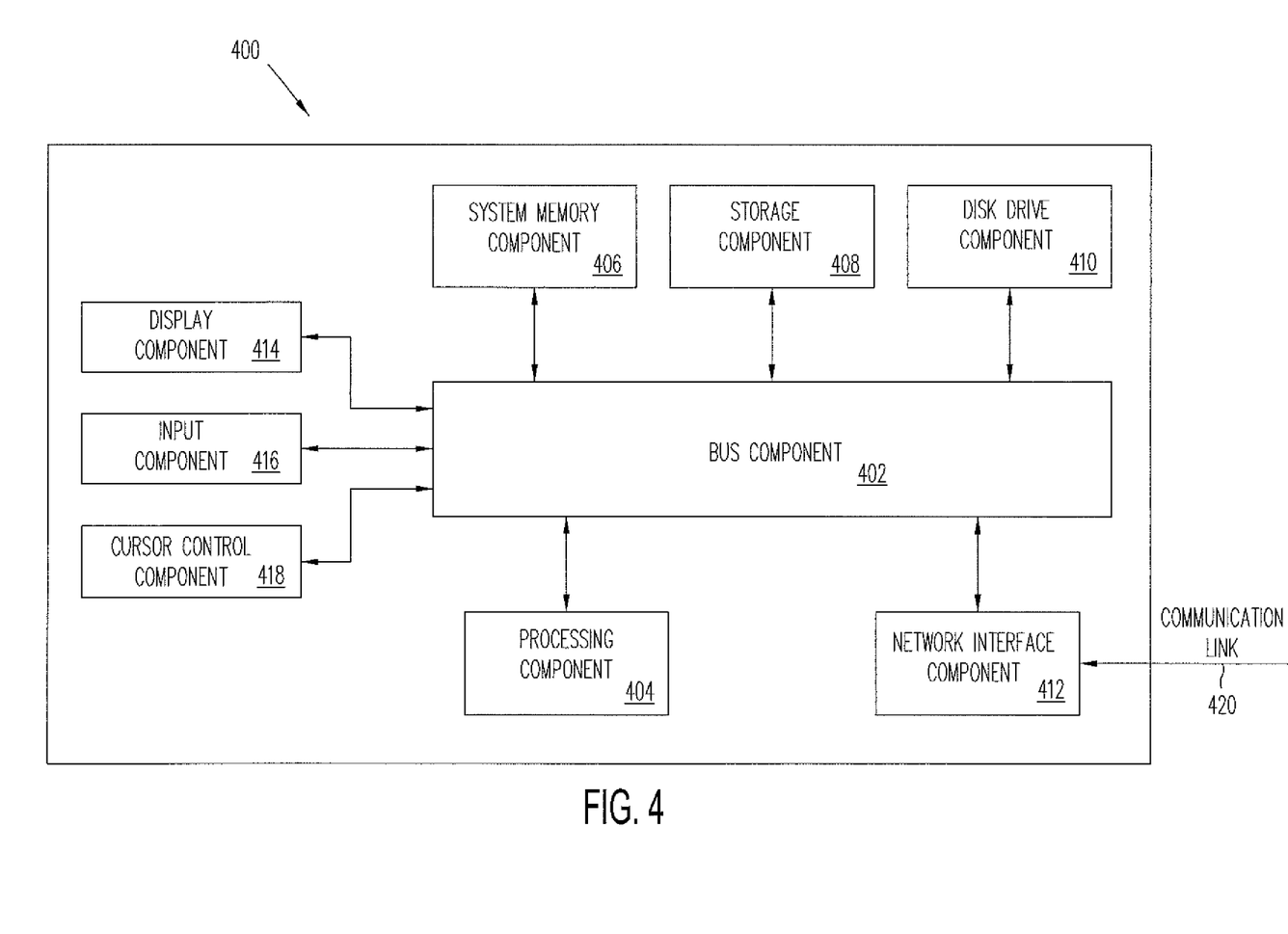
FIG. 4 is a block diagram of a system for implementing a device according to one embodiment of the present disclosure.

FIG. 4 is a block diagram of a system 400 suitable for implementing embodiments of the present disclosure, including user device 120, one or more merchant servers or devices 140, and remote server or device 180. System 400, such as part of a cell phone, mobile phone, smart phone, tablet, personal computer and/or a network server, includes a bus 402 or other communication mechanism for communicating information, which interconnects subsystems and components, including one or more of a processing component 404 (e.g., processor, micro-controller, digital signal processor (DSP), etc.), a system memory component 406 (e.g., RAM), a static storage component 408 (e.g., ROM), a network interface component 412, a display component 414 (or alternatively, an interface to an external display), an input component 416 (e.g., keypad, touchpad, or keyboard), and a cursor control component 418 (e.g., a mouse pad).

In accordance with embodiments of the present disclosure, system 400 performs specific operations by processor 404 executing one or more sequences of one or more instructions contained in system memory component 406. Such instructions may be read into system memory component 406 from another computer readable medium, such as static storage component 408. These may include instructions to process financial transactions, offer payment options, make payments, etc. In other embodiments, hard-wired circuitry may be used in place of or in combination with software instructions for implementation of one or more embodiments of the disclosure.

Logic may be encoded in a non-transitory computer readable medium, which may refer to any medium that participates in providing instructions to processor 404 for execution. Such a medium may take many forms, including but not limited to, non-volatile media, volatile media, and transmission media. In various implementations, volatile media includes dynamic memory, such as system memory component 406, and transmission media includes coaxial cables, copper wire, and fiber optics, including wires that comprise bus 402. Memory may be used to store visual representations of the different options for payments or transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 400. In various other embodiments, a plurality of systems 400 coupled by communication link 420 (e.g., network 160 of FIG. 1, LAN, WLAN, PTSN, or various other wired or wireless networks) may perform instruction sequences to practice the disclosure in coordination with one another. System 400 may transmit and receive messages, data, information and instructions, including one or more programs (i.e., application code) through communication link 420 and communication interface 412. Received program code may be executed by processor 404 as received and/or stored in disk drive component 410 or some other non-volatile storage component for execution.

Although various components and steps have been described herein as being associated with user device 120, merchant server 140, and remote server 180 of FIG. 1, it is contemplated that the various aspects of such servers illustrated in FIG. 1 may be distributed among a plurality of servers, devices, and/or other entities.

FIG. 1 illustrates an exemplary embodiment of a network-based system 100 for implementing one or more processes described herein. As shown, network-based system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure.

Having thus described embodiments of the disclosure, persons of ordinary skill in the art will recognize that changes may be made in form and detail without departing from the scope of the disclosure. Thus the disclosure is limited only by the claims.

What is claimed is:

1. A system, comprising:
   one or more processors; and
   a memory for storing instructions that, when executed by the one or more processors, cause the one or more processors to perform operations comprising:
   receive identity credentials to authenticate an identity of a user of a computing device at an online merchant in response to the user initiating a payment transaction for one or more items sold by the online merchant;
   retrieve account information associated with the user, the account information including past payment behavior associated with one or more past transactions with a second merchant that is a different entity than the online merchant;
   determine, based at least upon the past payment behavior, a preferred payment option and at least one alternate payment option from a plurality of payment options;

customizing a graphical user interface associated with a webpage of the online merchant;
causing display of the customized graphical user interface, the customized graphical user interface comprising a subset of the plurality of payment options including at least the preferred payment option, a first selectable interface option to select the at least one alternate payment option, and a second selectable graphical user interface element input indicating that the payment transaction is to be completed; and
upon receiving a selection of the first selectable user interface element, cause display of the plurality of payment options.

2. The system of claim 1, further comprising instructions that, when executed by the one or more processors, perform operations comprising display the at least one alternate payment, wherein the preferred payment option is displayed more prominently than the at least one alternate payment option.

3. The system of claim 2, wherein the plurality of payment options are hidden behind a link.

4. The system of claim 1, wherein the plurality of payment options are presented in an ordered list.

5. The system of claim 4, wherein an order of the ordered list is based, at least in part, on frequency of use.

6. The system of claim 4, wherein an order of the ordered list is based, at least in part, on a type of the merchant.

7. The system of claim 4, wherein an order of the ordered list is based, at least in part, on a type of the one or more items being purchased.

8. The system of claim 1, wherein the preferred payment option is associated with a payment service provider.

9. A method, comprising:
receiving, by one or more processors, identity credentials to authenticate an identity of a user of a computing device at an online merchant in response to the user selecting an item to purchase from the online merchant;
retrieving, by the one or more processors, account information associated with the user, the account information including past payment behavior of the user with a second merchant that is a different entity than the online merchant;
determining, by the one or more processors and based at least upon the past payment behavior, a preferred payment option and at least one alternate payment option from a plurality of payment options;
customizing, by the one or more processors, a graphical user interface associated with a webpage of the online merchant;
causing, by the one or more processor, display of the customized graphical user interface, the customized graphical user interface comprising the preferred payment option, the alternate payment option, and a selectable element that, when selected, causes a display of the plurality of payment options.

10. The method of claim 9, wherein the preferred payment option is displayed more prominently than the alternate payment option.

11. The method of claim 9, wherein the plurality of payment options are presented in an ordered list.

12. The method of claim 11, wherein an order of the ordered list is based, at least in part, on frequency of use.

13. The method of claim 11, wherein an order of the ordered list is based, at least in part, on a type of the online merchant.

14. The method of claim 11, wherein an order of the ordered list is based, at least in part, on a type of the item being purchased.

15. The method of claim 9, wherein the preferred payment option is associated with a payment service provider.

16. A method, comprising:
receiving, by one or more processors and through input provided on a merchant graphical user interface associated with a webpage of an online merchant, a selection of at least one item offered for sale by the online merchant;
receiving, by the one or more processors, identity credentials to authenticate an identity of a user of a computing device with a merchant server associated with the online merchant;
retrieving, by the one or more processors, account information associated with the user, the account information including past payment behavior of the user with a second merchant that is a different entity than the online merchant;
determining, by the one or more processors and based at least upon the past payment behavior, a preferred payment option and at least one alternate payment option from a plurality of payment options;
customizing, by the one or more processors, a graphical user interface associated with a webpage of the online merchant; and
causing, by the one or more processors, display of the customized graphical user interface, the customized graphical user interface comprising the preferred payment option and the alternate payment option, and a selectable dement that, when selected, causes a display of the plurality of payment options.

17. The method of claim 16, wherein the preferred payment option is displayed more prominently than the alternate payment option.

18. The method of claim 16, wherein the preferred payment option is selected from a group consisting of a payment service provider, a transaction card, a gift card, cash, and one or more special offers.

19. The method of claim 18 wherein the alternate payment option is selected from the group consisting of the payment service provider, the transaction card, the gift card, cash, and the one or more special offers but is different than the preferred payment option.

20. The method of claim 19. further comprising updating the preferred payment option in response to input that indicates that the preferred payment option is to be updated.

* * * * *

UNITED STATES PATENT AND TRADEMARK OFFICE
CERTIFICATE OF CORRECTION

PATENT NO. : 11,004,047 B2  
APPLICATION NO. : 15/920280  
DATED : May 11, 2021  
INVENTOR(S) : Remi Guyot Page 1 of 1

It is certified that error appears in the above-identified patent and that said Letters Patent is hereby corrected as shown below:

In the Claims

Column 12, Line 41, Claim 16, delete "dement" and insert -- element --, therefor.

Column 12, Line 55, Claim 20, delete "claim 19." and insert -- claim 19, --, therefor.

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*